United States Patent Office 3,591,336
Patented July 6, 1971

3,591,336
MINIMIZING CARBON IN PHOSPHORUS RECOVERY
Walter C. Saeman, Hamden, Conn., assignor to Olin Corporation
No Drawing. Continuation-in-part of application Ser. No. 727,115, Mar. 18, 1968, which is a continuation-in-part of application Ser. No. 398,306, Sept. 22, 1964. This application Sept. 22, 1969, Ser. No. 860,006
The portion of the term of the patent subsequent to Nov. 18, 1986, has been disclaimed
Int. Cl. C01b 25/12
U.S. Cl. 23—165          9 Claims

ABSTRACT OF THE DISCLOSURE

Phosphorus values in the form of $P_2O_5$ are recovered from phosphate ores reacted with carbon, silica and oxygen-containing gas in a rotary furnace having a vitreous lining held in place centrifugally.

This application is a continuation-in-part of copending application U.S. Ser. No. 727,115 filed Mar. 18, 1968, now U.S. Pat. 3,479,138 issued Nov. 18, 1969, which in turn is a continuation-in-part of U.S. Ser. No. 398,306, filed Sept. 22, 1964, now abandoned. The disclosures of these parent applications are incorporated herein by this reference as fully and completely as if literally copied herein.

This invention relates to pyrochemical processing of raw materials in a furnace and more particularly to the recovery of phosphorus values from phosphate ores.

This invention has as one of its objects provision of improved processing of phosphate ores in a centrifugally rotating furnace.

Another object is a new and improved method of processing phosphate ores for efficient and economic production of $P_2O_5$ directly from phosphate rock. By this method, the cost per ton of $P_2O_5$ is considerably less than by prior art processes.

More particularly, this invention relates to especially advantageous modifications and improvements in the process of the prior applications recited above whereby recovery of phosphorus values is substantially increased and reaction time is reduced to provide a significantly improved operation.

In conventional electric furnaces and blast furnaces, heat generation and heat distribution are not uniform, principally because the charge materials are poor heat conductors and convection is inadequate. The operation of the present invention avoids these difficulties, improves the efficiency of the operation, effectively reduces dust formation and results in a process stream richer in the phosphorus product. The process of the present invention is carried out in an open cavity furnace in which the charge is fused. The desired products are vaporized and removed from one end of the furnace while slag is removed from the other end of the furnace. Radiation of heat promotes good heat transfer, suppressing dust formation and, surprisingly, affords means for the oxidation of phosphorus to its pentoxide and CO to $CO_2$, greatly increasing fuel economy.

Klugh, in U.S. Pat. 1,492,713 maintains a molten slag as reaction medium, heats it by immersing arc electrodes therein and charges the reactants into the molten slag.

Lapple, in U.S. Pat. 3,241,917 maintains a reaction mixture of pulverulent reactants and products, covers the reaction mixture with an overlay of free coke to isolate the feed from the oxidizing atmosphere and to insulate the reaction mixture from the radiant heat of the flame. Lapple also limits the temperature to 1500° C. (2732° F.) to avoid sintering and formation of a fluid slag. In Lapple's furnace, two-thirds or more of the refractory insulation is directly exposed to the hot gases at flame temperatures and to the $P_2O_5$ and fluorine compounds contained therein. The resulting heat and corrosion are seriously deleterious to the life of the kiln. Residence times in hundreds of minutes are required compared to residence times of about 1 to 30 minutes in the process of the present invention.

U.S. Pat. 2,878,004 discloses and claims rotary furnaces especially suitable for carrying out the process of the present invention. That patent describes the fusion of natural phosphates for defluorination and the fusion of sodium chloride and sodium nitrate where the non-fused granular lining is material of the same kind as that being processed. Rotation of the furnace generates centrifugal force holding a substantial layer of unbonded granular thermal insulation on the inner wall of the furnace shell. Temperature is maintained to fuse the inner surface of the lining material to form the walls of a bowl of fused material adhering smoothly to the underlying unbounded granular material.

U.S. Pat. 3,030,094 shows a rotary fusion furnace in conjunction with a rotary preheat furnace. The fusion furnace is fed at one end and heated by a burner at the opposite end where means are provided for removal of the fusion product.

The rotary furnaces of U.S. Pat. 2,878,004 are of particular advantage in the chemical reduction of phosphate ores using carbonaceous reducing agents to recover the phosphorus values of the ores as phosphorus pentoxide. However, certain critical operating conditions must be observed and form the basis of the present invention. Under these conditions, surprisingly advantageous and unpredictable recoveries of phosphorus pentoxide are obtained.

According to the invention of the prior applications identified above, phosphate ore, for example, phosphate rock, is processed in a kiln having a vitreous liner maintained centrifugally on the walls of an elongated furnace cavity in a temperature range of 2800° F. to 4200° F. using carbon as a reducing agent. The evolved phosphorus and carbon monoxide are oxidized immediately in an oxidizing atmosphere to diminish fuel requirements and to produce phosphorus pentoxide and carbon dioxide.

According to the present invention the recovery of phosphorus values and the throughput are increased by maintaining on said lining a feed containing from 15 to 35 percent $P_2O_5$, said feed having a weight ratio of carbon to phosphorus of from 1.6:1 to 1.75:1 and introducing said feed at a rate of at least 5.5 pounds of $P_2O_5$ per hour per square foot of lining while maintaining the reaction temperature between about 3000° and 3100° F.

The furnace is first charged with particulate refractory which is distributed and maintained centrifugally against the shell of the kiln. Sand is particularly preferred as the refractory and the use of sand is particularly detailed here.

The vitreous liner is formed in the furnace by rotating the furnace shell, firing it internally with fuel and oxidizing gases and charging a suitable refractory in particulate form, preferably sand, at either end. The rotation centrifugally forms a bed of loose sand internally on the walls of the furnace and, as firing continues, the sand fuses on the internal surface of the bed. The firing is diminished until the fused liner solidifies to a vitreous lining appropriately from one-half to two inches thick and preferably about one inch thick along the length of the furnace cavity. Sand is fused suitably at about 3200° F. and vitrified by cooling to about 2800° F. Centrifugal action maintains both the vitreous liner and the underlying loose sand over the entire inner surface of the furnace, except in an exhaust zone.

A particular merit of the rotary furnace for phosphate reduction lies in using sand to form a loose bed adjacent the furnace shell and a vitreous protective inner liner. Sand is low in cost and in the process of this invention, provides advantageous and inexpensive linings. The formation of vitreous silica liners in rotary furnaces by centrifugal action from a bed of loose sand circumvents the serious spalling and cracking problem normally encountered with dense silica refractories. The thermal conductivity of the loose sand underlying the fused liner is only 10 percent that of carbon and about 25 percent that of fire brick. The silica is most effective as refractory in vitreous form on the unbounded granular bed of silica.

While sand is preferred as refractory and vitreous liner for this process, lime and limestone have particular advantages in high fusion temperature, insulating value, low cost and performance. Other oxidation resistant refractories are suitable in particulate form for use in this invention, including calcium, magnesium and aluminum silicates, oxides and carbonates. Examples are lime, limestone, magnesia, dolomite and clays. In using the refractories other than silica, silica is advantageously included in the feed to convert the inner surface of these refractories to a fluid slag which flows along the walls of the cavity. It penetrates the underlying refractory, becoming poorer in silica and richer in the base of the refractory. The fusion point increases and the temperature decreases progressively until the slag forms an impenetrable, solid layer on the underlying particulate refractory. This seal prevents further penetration of the slag, protecting the shell of the furnace and maintaining the reactants on the inner walls of the lining.

Alternatively, linings of silica mixed with the oxides of calcium, magnesium, aluminum are useful. They are suitably formed from physical mixtures of silica and the oxide or from chemically combined fusions of the oxides in granular form. The proportions of these oxides are chosen to yield mixtures with fusion points in excess of the melting point of silica. Combinations of these oxides are also suitably formed in the furnace by depositing centrifugally a layer of calcium, magnesium or aluminum oxide which is then covered with silica or a fusible silicate of a lower melting point.

The open cavity of the rotary furnace is fired with fuel gas and with an oxygen-containing gas. The latter is suitably air but preferably is oxygen-enriched air which is commercially and cheaply available. Pure oxygen or oxygen diluted with air is also suitable. When air is used, it is advantageously preheated to at least 1200° F. The fuel gas is suitably natural gas or waste hydrocarbon gases of high fuel value. Oil or powdered coal are also suitably used as fuels. In the process of this invention, the carbon monoxide and elemental phosphorus co-products are used as all or part of the fuel requirement. The total heat of oxidation of carbon to carbon dioxide and of phosphorus to its pentoxide are thus recovered and utilized in the process of this invention.

Having formed the vitreous liner as described, the introduction of phosphate ore, silica and carbon is started. The powdered components are agglomerated and the addition is intermittent or continuous. The ratios of carbon to ore and silica to lime are carefully controlled. The feed rate is sufficient to maintain a complete cover over the vitreous lining to protect the vitreous liner and the slag from radiant heat from the flame and from the action of the $P_2O_5$ formed.

Adjustment of feed rate and distribution serves to maintain a continuous covering for the vitreous liner and the slag and prevents the formation of localized hot zones due to overheating bare slag areas by the flame. Such localized hot zones result from too thin a feed layer and cause excessive volatilization of mineral fumes, $P_2O_5$ vapor is reabsorbed by the slag and the superheated slag may melt the liner, penetrating the underlying particulate refractory. Conversely, too thick a covering of feed on the vitreous liner causes the underlying slag to freeze and form a dam behind which molten slag accumulates. If this slag pool becomes too deep, slag cascading occurs, even though furnace shell rotation is above critical speed. Resulting effects are reabsorption of $P_2O_5$ vapor by the slag and gas turbulence which mixes the oxidizing and reducing gas zones, thus increasing direct oxidation of carbon to carbon dioxide and reducing phosphorus volatilization and production rates. These problems are avoided by maintaining uniform feed coverage, suitably 0.5 to 6 inches thick, on the vitreous liner.

More importantly, the improvement of the present invention is based, in part, on the elimination of excess carbon, increasing $P_2O_5$ content of the feed and faster feed rates than disclosed in the prior applications identified above. The relatively large amounts of carbon previously used with the phosphate ore to assure complete volatilization of the phosphorus are actually detrimental in that the excess carbon increases the total heat required to heat the feed to reaction temperatures and also reduces the thermal conductivity of the agglomerate of carbon and ore. By reducing excess amounts of carbon in the feed, the amount of heat required to heat the feed to reaction temperatures is reduced and feed is more rapidly heated to 3000° to 3100° F. Reducing excess carbon permits increasing the $P_2O_5$ content of the feed and the faster rate of heating permits higher feed rates. The result of these improvements is faster volatilization of phosphorus and carbon monoxide and displacement of oxygen in the furnace atmosphere away from zone of reaction of carbon and silica with the ore in the feed. The proportion of carbon in the feed which is oxidized to CO and $CO_2$ directly without reaction with the ore is reduced and maximum utilization of the carbon in reaction with the ore is obtained. The gas production from the furnace is richer in $P_2O_5$ and the production rate per square foot of lining is materially increased. Lower temperatures in the reaction mixture give increased production rates and the life of the lining at 3000° to 3100° F. is significantly longer than at the higher temperatures previously thought necessary to obtain satisfactory production rates.

The phosphate ore most commonly used in the present process is phosphate rock but other phosphate ores are useful, including apatite, fluoroapatite, chloroapatite, hydroapatite, francolite and wavellite.

The carbonaceous material in the feed to the furnace is suitably coke. It is appropriately incorporated as such with silica and phosphate ore in the feed or, alternatively, the feed is prepared using coal, silica, ore and then carbonizing the coal to coke in the mixture before feeding it to the phosphorus furnace. Mixed grades of coke ranging from fines to coarse lumps an inch in diameter and even up to 3 inches in diameter are especially advantages. The coarser fraction of the coke assures anchorage of these particles in the moving stream of fused slag on the inner liner. This avoids flotation of the coke on the slag and vastly improves reactive contact between the coke and ore. This in turn assures rapid and complete reduction of the phosphorus in the ore. The larger the coke lumps the thicker the layer of fused slag that can be carried without displacement of the coke lumps from the cavity wall. Coke fines are beneficial in that they increase the surface of carbon in contact with the ore while remaining enmeshed among the coarser lumps. Coke fines alone are undesirable since they do not agglomerate as readily and tend to float on and blanket the feed, preventing radiant heat transfer.

Preferably the average particle size of the coke is at least 4 times as thick as the layer of molten slag. The larger particles of coke do not float but rest solidly on the vitreous liner underlying the fused slag. In this manner, the entire inner surface of the liner is usable as reactive hearth surface for the coke while the molten slag flows past the coke particles in a thin, continuous sheet.

Because coke fines or breeze are considerably cheaper than lump coke, it is particularly advantageous to utilize all fines. This is accomplished by premixing fine coke with finely ground phosphate ore and agglomerating the mixture into pellets. The highest efficiency is achieved when the feeds are dry and the carbon is premixed with the ore prior to injection into the furnace.

More particularly, the rock and the coke are first preground, substantially all passing a 200 mesh screen, blended and granulated suitably in a mixer with the addition of moisture and a binder after which the resulting pellets are dried to pebbles up to about 1 inch in size. The dry, agglomerated mixture is fed into the reaction zone. The reduction proceeds rapidly and is completed at the reaction temperature.

Especially advantageous for reducing heat is requirements is the use of powdered coal for feed preparation, coking the coal in the feed mix and introducing the hot feed into the phosphorus furnace with minimum loss of heat during the transfer. Preheated feed at 500° to 2200° F. is especially advantageous in reducing heat requirements from other sources.

The theoretical carbon requirement for reducing the phosphorus in phosphate to elemental phosphorus is about 1.0 lb. carbon per pound phosphorus. However, to produce the temperatures necessary for the reaction, it has been customary to operate the rotary furnace for producing phosphoric acid under conditions where at least a portion of the carbon associated with the phosphate ore reacted directly with the oxygen in the furnace atmosphere. Additional quantities of carbon had to be associated with the ore to provide sufficient carbon for the complete volatilization of the phosphorus from the ore. It was also recognized that the phosphorus could be volatized at a faster rate as the temperature of the reactants was increased. However, even at 3140° F., the fusion temperature of the silica liner customarily used in the rotary furnace, the rate of phosphorus vapor evolution was insufficient to displace the oxygen from the carbon completely. Some loss of carbon by direct oxidation apparently had to be tolerated so long as the operating temperature was limited by the fusion temperature of the silica liner.

The improvement of the present invention limits the carbon content of the feed which increases the thermal conductivity of the feed and increases the rate of heat transfer from the flame in the furnace cavity to the surface of the agglomerate. Preheating the feed further reduces the heat requirement in the furnace. Also, by increasing the concentration of $P_2O_5$ in the ore, the amount of heat required to heat the feed to reaction temperatures and to volatilize the phosphorus is reduced. The phosphorus volatilization reaction then proceeds at a sufficient rate to displace the oxygen in the furnace atmosphere completely away from the feed resulting in maximum carbon utilization for reaction with the ore.

More specifically, limiting the ratio of carbon to $P_2O_5$ to 0.7:1 to 0.75:1 (C:P=1.6:1 to 1.75:1) results in an increased rate of phosphorus volatilization without increasing the temperature above 3100° F. As the $C/P_2O_5$ ratio in the feed was reduced, the phosphorus volatilization rate increased and resulted in further reduction of direct oxidation of carbon by the furnace gases. Thus at 3100° F., about 95 percent of the phosphorus in the feed is volatilized from feed having a $C:P_2O_5$ ratio of 0.7:1.

Further reduction in the $C:P_2O_5$ ratio effects no further improvement in phosphorus recovery and, indeed, decreases phosphorus recovery. No closer approach to the theoretical 1:1 ratio of C:P (0.45:1 ratio of $C:P_2O_5$) appears possible while maintaining the phosphorus recovery at 95 to 100 percent of theory. The difference (0.7—0.45) of 0.25 is termed matrix carbon and when less carbon is present in the feed than 0.7:1, the carbon available as matrix drops below 0.25:1 and the reaction stops because the carbon separates from the residual molten ore. So long as sufficient matrix carbon (0.25) is supplied, along with reaction carbon (0.45) to total 0.7:1 to 0.75:1, the reaction proceeds to 95 percent or better completion at 3000° to 3100° F.

At a feed rate of at least 5.5 pounds of $P_2O_5$ per hour per square foot of lining, the carbon is sufficient to reduce the impurities in the ore as well as 95 to 100 percent of the phosphorus present. Increasing the feed rate beyond 5.5 pounds of $P_2O_5$ per hour per square foot of lining results in an increase in the rate of production even though it effects no further increase in carbon efficiency or phosphorus volatilization efficiency since both of these are already substantially 100 percent. At feed rates up to 20 pounds of $P_2O_5$ per hour per square foot of lining, optimum performance of the furnace is attained without exceeding the fusion temperature of the lining and the service life of the lining is materially extended and the most economical operation of the process is achieved.

Varying amounts of silica in the ore contribute to the maintenance of the liner but some silica may be removed during the process in the form of calcium silicate slag. To maintain the liner, supplemental amounts of sand are introduced as a separate stream, or included in the pelletized feed or both. The additions of sand as necessary maintain the lining and the underlying bed when it is particulate sand. The furnace is open-ended and direct visual examination serves to control supplemental sand supply and to maintain the lining in optimum condition and thickness.

Excess silica in the phosphate feed results in progressive build-up of the liner in the feed zone. This positively maintains lining thickness during productive operation. By varying the position for placement of supplemental sand, if necessary, the lining is maintained and local repairs are made. As a further control of cavity shape, the inner surface is readily accessible and is suitably shaped using a mechanical boring bar intermittently to control and equalize local accumulations of less fusible residues in the rock feed.

The silica to calcium oxide weight ratio must be adjusted to be between 0.6:1 and 2.0:1, preferably from 1.0:1 to 1.5:1, to insure that the melting point of the slag is low enough to permit removal of liquid slag from the furnace.

The particle size of the feeds can be varied over a relatively wide range depending on the type of feed selected, method of furnace operation, type of carbon used and method of injecting the solids into the furnace. Preferred procedure involves forming an intimately mixed agglomerate from minus 10 mesh ore, coal, and silica, coking the coal in the mixture and injecting this agglomerate into the furnace to maintain uniform covering of the vitreous liner. Agglomeration can be accomplished with special advantage by elevated temperature techniques where partial melting of the feed materials provides binding action. Size of the particles of agglomerate are suitably from dust up to about 6 inches.

In operation, once the vitreous liner is formed as described above, the feed of ore, carbon and silica as the premixed agglomerates is started. The ore and carbon react and radiant heat induces volatilization of the phosphorus with carbon monoxide. The first gas mixture of volatilized phosphorus and carbon monoxide is immediately oxidized to a second gas mixture of phosphorus pentoxide and carbon dioxide in the cavity of the rotary furnace. This permits radiant recovery of the resulting heat values and drives the reaction rapidly. Calcium silicate slag is centrifugally removed from the rock and accumulates in the tapping zone at the firing end of the furnace zone where it is removed periodically or continuously and conveniently by a scoop-like scraper and/or trough.

Intermittent feeding requires feeders which are massive in size and require the opening of the furnace door to inject the feed. In intermittent feeding, the injection of massive amounts of cold feed drops the furnace temperature abruptly below the reaction temperature and the reaction is temporarily arrested. It does not resume until the feed cycle is completed and the furnace temperature recovers to the reaction temperature from stored heat in the furnace or by supplementary fuel. After the feed charge is consumed by the reaction, the feed cycle is repeated. It is a characteristic of intermittent feed that the reaction also proceeds intermittently in time.

In contrast, continuous feeding injects the furnace feed at a sufficient velocity to reach the remotest boundary of the vitreous liner by velocity and/or gas blast alone. The feed is injected through a small port in the furnace door and in small amounts per unit time. The furnace temperature never drops below the reaction temperature and the reaction is continuously maintained. Continuous feeding is suitably accomplished by injecting the feed fully continuously or in small intermittent feed increments at short time intervals which permits maintaining the reaction temperature and continuous production of product.

By maintaining flame temperatures in the range of 3100° to 4800° F. or higher and by rapidly removing the slag from unreacted feed centrifugally, the reaction temperature is maintained at 3000° to 3100° F. and an advantageously high rate of heat transfer is maintained between the radiant heat of the flame and the feed. Generally, the heat flux is at the rate of 10,000 B.t.u./hr./ft.$^2$ of vitreous liner at a flame temperature of 3200° F., 100,000 B.t.u. at 3800° F. and 350,000 B.t.u. at 4800° F. The feed rate is kept high enough to maintain complete coverage of the vitreous liner and the $P_2O_5$ production rate is about 5.5 to 20 lb./hr./ft.$^2$ of vitreous liner.

EXAMPLE I

Cold feed agglomerate containing 25 percent $P_2O_5$ and 17.5 percent fixed carbon having a $C/P_2O_5$ ratio of 0.7 and a C/P ratio of 1.6/1 was injected into a 40-inch diameter centrifugally rotating furnace having a vitreous silica lining with an internal cavity diameter of 18 inches at the rate of 26 pounds of fed agglomerate per hour per square foot of internal hearth area. The temperature of the hearth was maintained at 3050° F. by combustion of gaseous fuel equivalent to 5000 B.t.u. per pound of $P_2O_5$ in the feed. The feed rate was 6.5 pounds of $P_2O_5$ per hour per square foot of hearth and the $P_2O_5$ was volatilized at the rate of 6.3 pounds per hour per square foot. This rate is sufficient to displace the oxygen-containing furnace gases completely from the carbon in the feed. About 0.43 pound of carbon per pound of $P_2O_5$ charged was used for reduction of the phosphorus and impurities in the ore so that over 95 percent of the phosphorus was volatilized. The hearth temperature was less than 3150° F. which is the fusion temperature of the lining and there was no deterioration of lining after 24 hours of operation.

EXAMPLE II

Feed aglomerate containing 18 percent $P_2O_5$ and 13.5 percent fixed carbon having a $C/P_2O_5$ ratio of 0.75/1 and and C/P ratio of 1.72/1 was preheated to 1000° F. and injected into a 40-inch diameter rotary furnace having a vitreous silica lining with an internal cavity diameter of 18 inches at a rate of 33 pounds of feed agglomerate per hour square foot of internal hearth area. The hearth temperature was maintained at 3050° F. by the combustion of auxiliary gaseous fuel equivalent to 4000 B.t.u./lb. $P_2O_5$. The feed rate was about 6 pounds of $P_2O_5$ per hour per square foot of lining and the $P_2O_5$ was volatilized at the rate 5.7 lbs. $P_2O_5$ per hour per square foot. This amounts to a recovery of 95 percent. The loss of carbon from the agglomerate by direct reaction with furnace gases was negligble and about 0.47 pound of carbon per pound of $P_2O_5$ was used for reducing the phosphorus and the impurities in the ore. The high rate of evolution of phosphorus vapor and CO away from the reaction mixture assured the complete displacement of oxygen in the furnace gases from the surface of the reaction mixture and avoided direct oxidation of the carbon in the feed to carbon dioxide.

The advantages of the process of this invention were shown by the following contrasting operation with a higher ratio of carbon and a lower fed rate.

Cold feed agglomerate containing 18 percent $P_2O_5$ and 16 percent fixed carbon having a $C/P_2O_5$ ratio of 0.9/1 and a C/P ratio of 2.06:1 was injected into a 40-inch diameter centrifugally rotating furnace having an internal cavity diameter of 18 inches at the rate of 25 pounds of feed agglomerate per hour per square foot of internal hearth area. The hearth temperature was 3200° F. Supplemental gaseous fuel equivalent to 15,000 B.t.u./lb. $P_2O_5$ was required to maintain the operating temperature at 3200° F. The feed rate was only 4.5 pounds of $P_2O_5$ per hour per square foot of lining and the production rate was 3.6 pounds of $P_2O_5$ per hour per square foot. This is a recovery of only 80 percent. The high lateral flow velocity of the furnace gases caused the unavoidable loss by direct oxidation of 0.25 pound of carbon per pound of $P_2O_5$. This loss, in combination with 0.27 pound of carbon required to maintain the matrix left only 0.38 pound of carbon per pound of $P_2O_5$ for the reduction of the impurities and the phosphorus of the ore. This accounts for the low recovery. Moreover, the high operating temperature caused the furnace lining to fail after 4 hours.

Among the special advantages of the process of the present invention are:

(1) Increasing the $P_2O_5$ content of the feed mixture and the rate of feed so that the phosphorus reducing reaction proceeds at a high rate and the flow of phosphorus vapor and carbon monoxide away from the surface of the agglomerate displaces the oxygen in the furnace atmosphere away from the carbon mixed with the ore.

(2) Reducing the amount of oxygen-containing gases in the furnace cavity thereby reducing their contact with the carbon mixed with the ore.

(3) Reducing the ratio of carbon mixed with the ore to that required for the reduction reaction and for maintaining the matrix to improve the heat flux from the flame in the furnace cavity to the reaction mixture without exceeding the fusion temperature of the lining.

(4) Preferably preheating the feed of ore, carbon and silica without exceeding the reaction temperature to minimize the heat required to be introduced by extraneous fuel and oxygen to further minimize oxidation of the carbon in the feed mixture.

What is claimed is:

1. In the thermochemical process for recovery of $P_2O_5$ from phosphate ores wherein a feed of silica, carbon and the phosphatic ore is heated to produce a slag and a first gaseous mixture of $P_4$ and CO; said first gaseous mixture is heated with an oxygen-containing gas to form a second gaseous mixture of $P_2O_5$ and $CO_2$; and $P_2O_5$ is separated from said second gaseous mixture; and wherein: (1) a bed of particulate refractory is distributed and centrifugally maintained in a rotating kiln; (2) a centrifugally maintained vitreous lining on said refractory is formed by fusing the inner surface of said refractory and cooling the resulting fused surface; (3) and feed is distributed and centrifugally maintained on said lining; (4) oxygen-containing gas and fuel is burned in said kiln to produce heat and flame, thereby maintaining the reaction temperature between about 2800° and 4200° F., forming said slag and said first gaseous mixture and converting said first gaseous mixture to said second gaseous mixture; (5) said slag is centrifugally transferred from said feed to said liner thereby maintaining radiant heat exchange between said flame and said feed; and (6) said slag and said second gaseous mixture are removed as separate streams from said kiln and said $P_2O_5$ is separated from said second gaseous mixture; the improvement wherein:
(1) Said feed contains from 15 to 35 percent $P_2O_5$ and a weight ratio of carbon to phosphorus of from 1.6:1 to 1.75:1 and introducing said feed at a rate of at least 5.5 pounds of $P_2O_5$ per hour per square foot of lining; and
(2) Said reaction temperature is maintained between about 3000° and 3100° F.

2. Process as claimed in claim 1 which said feed is agglomerated and has a particle size from dust up to 6 inches in diameter.

3. Process as claimed in claim 1 in which the weight ratio of $SiO_2$:CaO in said feed is from 0.6:1 to 2.0:1.

4. Process as claimed in claim 1 in which the rate of heat transfer from said flame to said feed is at least 10,000 B.t.u. per hour per square foot of vitreous lining.

5. Process as claimed in claim 1 in which said oxygen-containing gas is oxygen enriched air.

6. Process as claimed in claim 1 in which said oxygen-bearing gas is preheated to a temperature of at least 1200° F.

7. Process as claimed in claim 1 in which said oxygen-bearing gas is oxygen.

8. Process as claimed in claim 1 in which said feed is introduced continuously.

9. Process as claimed in claim 1 in which said feed is preheated to 500° to 2200° F.

References Cited

UNITED STATES PATENTS 3,479,138  11/1969  Saeman _____ 23—165

OSCAR R. VERTIZ, Primary Examiner

G. A. HELLER, Assistant Examiner

U.S. Cl. X.R.

23—150, 279; 263—32

PO-1050
(5/69)

UNITED STATES PATENT OFFICE
CERTIFICATE OF CORRECTION

Patent No. 3,591,336                    Dated July 6, 1971

Inventor(s) Walter C. Saeman

It is certified that error appears in the above-identified patent and that said Letters Patent are hereby corrected as shown below:

Column 4, line 57, "vantages" should read --vantageous--.

Column 5, line 18, "is" should be deleted;
         line 37, "volatized" should read --volatilized--.

Column 7, line 43, "fed" should read --feed--;
         line 60, "aglomerate" should read --agglomerate--;
         line 66, before the word "square" insert --per--.

Column 8, line 9, "fed" should read --feed--;
         line 64, after "(3)" delete "and" and insert --said--.

Column 9, line 10, before "which" insert --in--.

Signed and sealed this 25th day of January 1972.

(SEAL)
Attest:

EDWARD M. FLETCHER, JR.
Attesting Officer

ROBERT GOTTSCHALK
Commissioner of Patents